Dec. 15, 1964
N. CARRILLO
3,161,109
SLIDE PROJECTOR
Filed Feb. 19, 1960
2 Sheets-Sheet 1
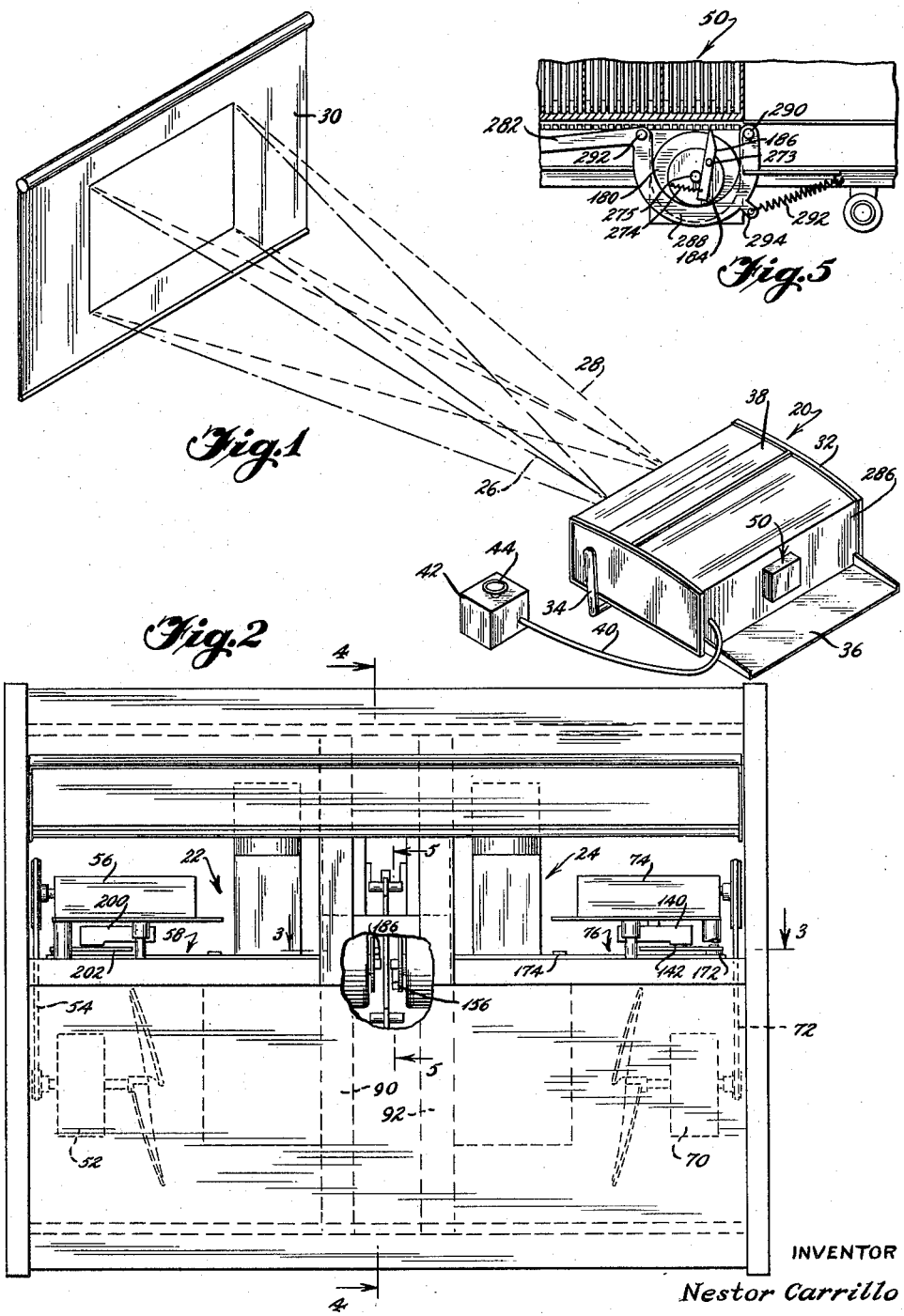
INVENTOR
Nestor Carrillo
BY
ATTORNEY

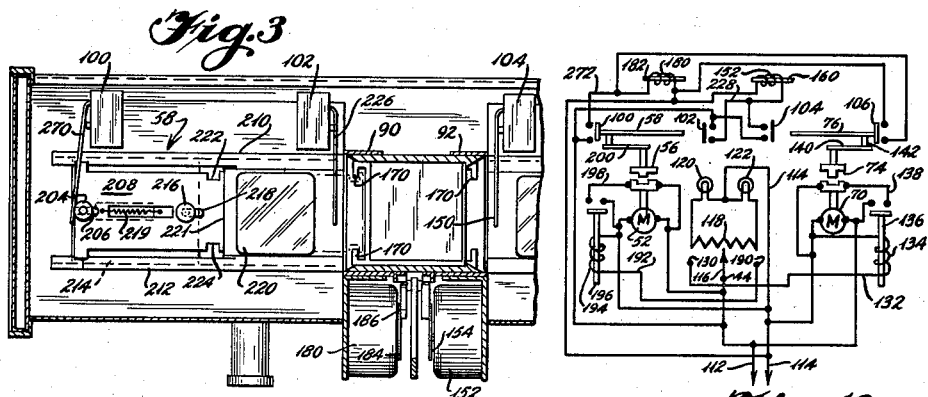

3,161,109
SLIDE PROJECTOR
Nestor Carrillo, I.B.E.C., Cangallo 332,
Buenos Aires, Argentina
Filed Feb. 19, 1960, Ser. No. 9,750
8 Claims. (Cl. 88—28)

This invention relates generally to the class of still picture or slide projectors. More particularly, the invention relates to a slide projector including two associated projecting units and having a single control by which pictures from the projecting units can be dissolved and developed on a screen, the slides can be fed between the projecting units and a magazine, and the magazine can be synchronously moved in step-by-step fashion as the slides are viewed.

This application is a continuation-in-part of my application Serial No. 792,045, on Slide Projector, filed February 9, 1959, Patent 3,093,030 dated June 11, 1963.

Heretofore, slide projectors have been provided with apparatus for simultaneously closing off the light aperture in one projecting unit and opening the light aperture of an adjacent projecting unit. Many such devices have employed mechanical linkages for actuating screens or leaves to move in front of and away from the light apertures located adjacent the illuminating light bulbs. Such mechanical linkages require adjustment and replacement of parts.

Further, in the use of some prior projectors having only one projecting unit, there are periods of total darkness of the viewing screen during the transition from one slide to the next. This breaks the continuity of the program being presented and is unpleasant to the viewers or audience.

In many prior projectors, a separate mechanism has been required for feeding slides to each projecting unit. In some prior projectors, the slides are removed from the magazine, or slide tray, passed in front of the projecting unit for viewing, and removed from the opposite side of the projecting unit. In such constructions, it has been necessary manually to move the previously-viewed slide back to its position in the slide tray. This requires additional time and effort and raises the possibility that the slides will be replaced in improper order thus causing confusion and delay in subsequent presentations.

It is an object of the invention to overcome the disadvantages of prior devices and provide a multiple slide projector having apparatus for feeding slides from a magazine alternately to a plurality of projecting units and automatically returning the slides to their original slots in the magazine after viewing. Thus, after viewing all of the slides, or a portion thereof, the magazine is loaded with slides in proper order for subsequent presentation.

It is a further object to provide a multiple slide projector having a single control for performing the following three operations in timed relation: (1) synchronously and gradually darkening the light source of one projecting unit and simultaneously lighting the light source of the adjacent projecting unit; (2) feeding successive slides from the magazine alternately to each of the two adjacent projecting units and returning the slides to the magazine after viewing, and (3) moving the slide magazine in alternate directions in timed relation with the insertion and removal of slides therefrom so that the appropriate slot is in position for delivery of a slide to a projecting unit and for receiving the slide back from the projecting unit after viewing.

It is a further object to provide a multiple slide projector having apparatus for simultaneously gradually darkening the light source or bulb of one projecting unit and gradually lighting the bulb of the adjacent projecting unit.

It is a further object to provide a variable electrical load for gradually decreasing the electrical current through the light bulb or source of one projecting unit while simultaneously increasing the electrical current through the light bulb of the adjacent unit so that one image gradually fades from the viewing screen as the other image gradually appears.

Another object is to provide a multiple slide projector having a remote control panel from which the operator can, by manipulating a single control, gradually dissolve one image from the viewing screen while gradually developing the next image on the screen, automatically withdraw from a projector a slide which has been shown and feed the succeeding slide into position to be subsequently shown, and move a slide magazine into position for the isertion and removal of slides.

Another object is to provide a slide magazine for containing a plurality of slides constructed so that the slides can be removed from both sides of the magazine and delivered to projecting units.

A further object is to provide slide projecting apparatus for moving a slide magazine alternately forwardly and reversely so that slides can be removed from opposite sides of the magazine to adjacent projecting units for viewing and returned to their original slots after viewing.

Other and further objects and advantages of the invention will be apparent as the description proceeds and upon reference to the drawings wherein:

FIG. 1 is a perspective view of a dual slide projector according to the invention and illustrating the manner of use;

FIG. 2, a top plan view to an enlarged scale of the projector of FIG. 1, with a cover lifted to expose some of the internal apparatus;

FIG. 3, a fragmentary vertical section on the line 3—3 of FIG. 2;

FIG. 4, a longitudinal vertical section on the line 4—4 in FIG. 2;

FIG. 5, a vertical fragmentary section on the line 5—5 in FIG. 2;

FIG. 6, a perspective view of a slide magazine according to the invention;

FIG. 7, a section on the line 7—7 in FIG. 6;

FIG. 8, a fragmentary elevational view of the slide magazine shown in FIG. 6;

FIG. 9, a fragmentary horizontal section on the line 9—9 in FIG. 8; and

FIG. 10, a schematic diagram of the electrical circuit employed in the dual slide projector shown in FIGS. 1–5.

Briefly stated, the present invention includes a slide projector with two adjacent projecting units, each with its own independent bulb or light source and lenses. A slide magazine or tray is provided for insertion into a track extending between the two projecting units. The magazine is so constructed that slides can be withdrawn alternately from each of the sides and delivered to positions in each projecting unit for subsequent viewing.

A single control is provided with which the operator can gradually darken the light source of one projecting unit and simultaneously gradually light that of the adjacent projecting unit, by means of a single variable electrical load or impedance. After the dissolving of one image and the developing of the other, the control may be operated to actuate members which withdraw the previously viewed slide from the dark projector and insert it into its proper slot in the magazine.

Upon the return of the previously-viewed slide to the magazine, mechanism is energized to advance the magazine by a distance corresponding to two slots in the magazine so as to present a subsequent slide to the member. After this advancement, the member engages the slide and withdraws it from the magazine and delivers it to position in the darkened unit for subsequent viewing. Upon the end of the delivery stroke, mechanism is energized for moving the magazine rearwardly a distance corresponding to one slot so that the magazine is in position to receive the slide then being shown by the lightened projector upon the next cycle of operation.

For feeding of the successive slides from the magazine, mechanical or electrical apparatus can be employed.

When feeding is accomplished electrically, the electrical load or potentiometer includes contacts at opposite ends of the path of travel of its contact arm for alternately closing solenoids controlling clutches for operating the slide-changing members. The slide-changing members are moved alternately in opposite directions to return previously-viewed slides to the magazine and withdraw succeeding slides therefrom.

Referring to the drawings and particularly to FIGS. 1 and 2, the dual projector 20 according to the invention includes a left-hand projecting unit 22, and a right-hand projecting unit 24 for projecting, respectively, beams 26 and 28 onto a viewing screen 30. The projector 20 includes a frame 32, support legs 34, a pivotable back plate 36, and a pivotable top plate 38. A control cable 40 extends from the rear of the projector to a control block 42 having an operating knob 44. A slide magazine or tray 50 is insertable into the projector 20 in position between the projecting units 22 and 24. The rear end of the magazine 50 is shown in FIG. 1 extending from the body of the projector case 32.

The projecting unit 22 includes a fan and associated motor 52 which supplies mechanical power through a belt 54 to a clutch 56 for actuating a slide-changing member 58 which removes previously-viewed slides from the unit 22 and delivers successive slides thereto. Similarly, the projecting unit 24 includes a cooling fan and associated motor 70 which supplies mechanical power through a belt 72 to a clutch mechanism 74 engageable for actuating slide-changing member 76 for removing previously-viewed slides from unit 24 and delivering successive slides thereto. The slide-changers 58 and 76 are coplanar to minimize focusing problems.

The slide magazine 50, shown in detail in FIGS. 6–9, is insertable in a track formed in the projector 20 by two U-shaped track members 90 and 92. Apparatus is provided for moving the magazine 50 forward, in the direction toward screen 30, so as to present slides for engagement by slide-changers 58 and 76, respectively, for delivery to the projecting units. The magazine-moving apparatus also moves the magazine 50 in rearward fashion, at the proper times, away from the screen 30 so that the previously-viewed slide is returned to its original slot in the magazine.

The single control knob 44 controls the electrical dissolving and developing of the images produced by units 22 and 24, and also energizes the clutches 56 and 74 to withdraw and insert slides in the magazine 50. Referring to FIG. 10, the coplanar slide-changers 58 and 76, close microswitches 100, 102, 104, and 106 actuating the magazine moving apparatus 110 for moving the magazine in the forward and rearward fashion previously described.

Referring to FIG. 10, electrical power is supplied from a conventional electrical power supply across lines 112 and 114. Line 112 is connected to a potentiometer having a movable contact arm 116 engaging a resistance 118 for varying the supply of electrical current to bulb 120 of unit 22 and bulb 122 of unit 24. Line 114 completes the circuit to the bulbs. Movement of the contact arm 116 to the left, as seen in FIG. 10, will increase the current to bulb 120, thus developing the image cast by unit 22; and decrease the current to bulb 122, thus dissolving the image cast by unit 24. When the arm 116 reaches the left-hand end of its stroke, it encounters contact 130 so that power is delivered through lead 132 to solenoid 134. Energization of solenoid 134 causes armature 136 to close the circuit in line 138 thus delivering power to electrical clutch 74.

The engagement of clutch 74 produces changing of the slide in darkened projector 24. The clutch 74 rotates crank 140 moving pitman 142 driving slide-changer 76. The slide-changer 76 includes two superposed plates connected so as to move in unison over most of their path of travel. The plates have a lost-motion connection so that they are movable relative to each other over a short distance. The slide-changer 76 has a detailed construction similar to slide-changer 58, fully-described hereinafter. The initial actuation of the slide plunger changer is to the left as seen in FIG. 10 to remove the previously-viewed slide from unit 24 and return the slide to its original slot in the magazine 50. At the end of this stroke the slide changer 76 strikes actuating bar 150 of microswitch 104, energizing circular solenoid 152, to produce rotation of disk 154, referring to FIGS. 3 and 4, carrying thereon pawl or tooth 156 engaging rack 158 formed on the bottom of magazine 50. The solenoid 152 is so constructed and the tooth 156 so arranged on disk 154 that the movement of the armature 160 of solenoid 152 causes tooth 156 to advance the magazine 50 toward the front 162 of the projector 20, two slot pitches. The term "slotpitch" as used herein, means the distance between the center lines of two adjacent slots in the magazine.

By the above-described forward movement of magazine 50 the next slide in the magazine is advanced to position so that its hooks 170 can be engaged by slide-changer 76. For producing the reciprocation of slide-changer 76, pitman 142 is connected to button 172 of changer 76. The button 172 is integral with one of the plates of changer 76. A second button 174 aids in maintaining the two plates of slide changer 76 in parallel relation.

After the above described two-pitch advancing of the magazine 50, the slide changer 76 is moved to the right as seen in FIG. 2 and withdraws the next succeeding slide from the magazine 50 by engagement with slide hooks 170. When the slide changer 76 delivers the next slide into position for projection by unit 24, the slide changer 76 closes microswitch 106 to energize the circular solenoid 180 having an armature 182 causing rotation of a disk 184 having a pawl or tooth 186 pivotally mounted thereon. Referring to FIG. 5, the solenoid 180 is so constructed and the tooth 186 is so arranged on disk 184 that the throw of the armature 182 causes tooth 186 to engage the rack 158 and move the magazine rearwardly by a distance equal to one slot pitch.

After the viewing of the image projected by unit 22 illuminated by bulb 120, when it is desired to proceed to the next slide, the operator moves the potentiometer contact arm 116 to the right as viewed in FIG. 10. The image projected by unit 22 gradually dissolves while the image projected by unit 24 gradually develops with a gradual transition.

When the contact arm 116 reaches contact 190, electrical power is supplied through lead 192 to solenoid 194, so constructed that its armature 196 closes the circuit through line 198 to energize electric clutch 56. The clutch is thereby engaged and crank 200 rotated to reciprocate pitman 202 driving slide-changer 58. The pitman 202 is pivotally connected to knob 204 having a diminished neck portion received in a slot 206 formed in slide engaging plate 208 of slide-changer 58.

The slide-changer 58 includes an upper track 210 and a similar lower track 212. The pair of plates 208 and 214 are slidably mounted in the tracks 210 and 212 for reciprocation therein.

The plate 214 has the buttons 204 and 216 rigidly connected thereto. The button 216 has a diminished portion slidably received in a slot 218 formed in slide-engaging plate 208. Thus, the buttons 204 and 216 and their associated slots provide a lost-motion connection between plates 208 and 214 permitting limited movement of the plates relative to each other. A spring 219 has its opposite ends connected to the plates 208 and 214 and yieldably urges the plates to the position shown in FIG. 3.

For pushing the previously viewed slide, such as slide 220 shown in FIG. 3, back into magazine 50, the slide engaging plate 208 is provided with an end surface 221. For pulling the next slide out of the magazine 50, the slide engaging plate 208 is provided with oppositely disposed notches 222 and 224 for receiving hooks 170 formed on the slide.

When the slide-changer plates 208 and 214 are moved to the right, as seen in FIG. 3, the slide 220 is returned to the appropriate slot 222 in magazine 50. At the end of the stroke, the slide has been pushed until one end engages the wall 224 forming the end of the slot 222, referring to FIG. 9. The plate 208 strikes contact arm 226 of microswitch 102 to close the circuit through lead 228 to energize circular solenoid 152 and produce a rotation of armature 160 and disk 154 connected thereto. The disk 154 rotates with shaft 250.

Referring to FIG. 4, the tooth 156 is pivotally mounted on pin 252 secured to disk 154. A tension spring 254 has one end secured to the disk 154 and the opposite end secured to the tooth 156 so as to urge the tooth to the position shown in FIG. 4 wherein a portion of the tooth engages the shaft 250. The movement of the armature 160 causes the rotation of disk 154 and the tooth 156 engages the rack 158 on magazine 50 to advance the magazine two slot pitches. After this advancement, a spring (not shown) within solenoid 152 rotates disc 154 clockwise as seen in FIG. 4. The tooth pivots on pin 252, and spring 254 extends to permit the tooth to ride over the rack teeth.

During the portion of the cycle described in the foregoing paragraph, when the magazine 50 is being advanced two slot pitches, the drive plate 214 continues to move to the right as seen in FIG. 3, being driven by the pitman 202. The plate 208 remains stationary while the plate 214 moves relative thereto. The buttons 204 and 216 slide in the slots 206 and 218, respectively, and the tension spring 219 is extended. The plate 214 reaches the innermost end of its stroke and then, being driven by the pitman 202 and crank 200, reverses its direction and returns to the left as seen in FIG. 3.

The lost motion connection, when the plate 214 is moving but the plate 208 is stationary, is of sufficient duration that the two-pitch advancement of magazine 50 takes place therein. The advancement of the magazine 50 by two slot pitches brings a succeeding slide into registry with the slide advancer 58 so that the hooks 170 of the slide are received at notches 222 and 224 of slide engaging plate 208.

After the advancement of magazine 50 by two slot pitches, the slide-changer plates 208 and 214 are moved to the left, as viewed in FIG. 3, and the succeeding slide is withdrawn from the magazine by the engagement of slide hooks 170 in notches 222 and 224. When the next slide is in position in front of bulb 120 of projecting unit 22, the button 204 strikes contact arm 270 of microswitch 100 to close the circuit through lead 272, thus energizing circular solenoid 180. The energization of solenoid 180 causes rotation of armature 182 and disk 184 and tooth 186 pivotally mounted thereon.

Referring to FIG. 5, the tooth 186 is pivotally mounted on pin 273 secured to disk 184. A tension spring 274 has one end secured to the disk 184 and the opposite end secured to the tooth 186 so as yieldably to urge the tooth to the position shown in FIG. 5 wherein the tooth engages shaft 275. The tooth 186 moves the magazine 50 rearwardly one slot pitch to a position where the next energization of slide-changer 76 can deliver the previously-viewed slide from unit 24 into its original slot in magazine 50.

Referring to FIGS. 4 and 5, the magazine 50 is maintained in its track by a support 280 including a lever arm 282 pivotally mounted on plate 284 secured to frame member 286. A U-shaped portion 288 has one end integral with the arm 282. A pair of cylindrical rolls 290 and 292 are mounted in the opposite ends of the U-shaped portion 288 and extend sidewardly therefrom for engagement with the teeth of rack 158. A tension spring 292 has one end connected to extension 294 of U-shaped portion 288 and its opposite end secured to hook 296 secured to the bottom of frame 32. The spring 292 yieldably presses the rolls 290 and 292 against the rack to releasably maintain the magazine in any position.

The magazine 50 is inventively designed and constructed to provide for insertion and removal of slides from both sides thereof. Referring to FIGS. 6 to 9, the magazine includes a lower panel or bottom 300 with rack 158 formed thereon; an upper panel or top 302 spaced from and parallel to the lower panel 300. A pair of end panels 304 and 306 connect the ends of the upper and lower panels 300 and 302. The end panels 304 and 306 are cut away at 307 to permit passage of magazine 50 through the machine.

For guiding and nesting the slides in the magazine 50, a plurality of slots 222 are defined by ridges or septums 310 extending inwardly from the inner surfaces of the panels 300 and 302. The septums 310 are spaced by a distance sufficient to accommodate a slide therebetween. Blocks 312 connect alternate adjacent septums on side 314 of the magazine. Similarly, blocks 316 connect alternate adjacent septums on side 318 of magazine 50. The blocks 312 and 316 have their sides tapering to an outermost point to provide widened entrances to the slots 222 for guiding the slides into the slots.

Referring to FIG. 8, it will be seen that the panels 300 and 302 are beveled from their inner surfaces toward their outer surfaces and that the blocks 312 and 316 are similarly curved to provide further guidance for the slides. Referring to FIG. 9, the slots 222 have entrances alternately from opposite sides of the magazine for supplying slides to both the projecting units 22 and 24.

Further to strengthen and rigidify the magazine 50 intermediate partitions 320 are formed extending between some of opposed septums 310 and having holes formed therein for economy of material.

Much of the operation of the illustrated embodiment of the invention has been previously described because it was believed most clear to present the operation concurrently with the relationship of the structural elements. However, in summary, the operation of the invention is as follows. The magazine 50, loaded with slides in the order to be viewed, is inserted in the rear of the projector 20 between the U-shaped tracks 90 and 92. The magazine 50 is inserted to a point where the foremost slot 222 is behind the location of slide-changers 58 and 76 by a distance equal to two slot pitches. This can be accomplished by making an indicia mark on the outer surface of magazine panel 302 and aligning this indicia mark with the rear wall 286 of the projector frame 32. Power is supplied to the leads 112 and 114 from a conventional power source. The motors 52 and 70 run continuously for operating clutches 56 and 74. The contact arm 116 is moved to the left as seen in FIG. 10, until it engages contact 130 to energize solenoid 134 and close the circuit through electric clutch 74. The clutch 74 is thereby engaged and the crank 140 rotates with pitman 142 to move slide changer 76, first to the left as seen in FIGS. 3 and 10.

The slide changer 76 moves to the left until it actuates contact arm 150 of microswitch 104 to operate solenoid 152 and cause resultant rotation of disk 154 and tooth 156. The tooth 156 moves the magazine forward by a distance equal to two slot pitches to move the hooks 170 of the first slide in magazine 50 into engagement with the notches in slide changer 76. Subsequently, the slide-changer 76 withdraws the first slide from the magazine 50 and delivers it to viewing position in projecting unit 24. At the end of the right-hand stroke of slide-changer 76 the microswitch 106 is closed to energize the solenoid 180, causing rotation of armature 182 and disk 184. Tooth 186 moves the magazine 50 rearwardly by a distance equal to one slot pitch.

Each of the armatures 182 and 160 are pressed by springs not illustrated to return them to original position after they have moved the magazine 50. During this return movement the pivoting of the teeth 156 and 186 allows an over-riding motion to occur, with stretching of spring 254 and spring 274 respectively.

The contact arm 116 is moved to the right as seen in FIG. 10 to brighten the bulb 122 and thus project the image of the slide in unit 24 upon screen 30 and darken bulb 120. At the end of this right-hand stroke, the contact arm 116 engages contact 190 to energize solenoid 194, thereby actuating armature 196 to close the electrical circuit through lead 198 with resultant engagement of electrical clutch 56. The crank 200 is thus rotated and pitman 202 moves the slide-changer 58 to the right as seen in FIGS. 2 and 3. Since the projecting unit 22 contains no slide at this time, the plate 208 engages no slide during its right-hand stroke. At the end of the right-hand stroke, the surface 221 of plate 208 engages contact arm 226 of microswitch 102 to close the electrical circuit through solenoid 152 and, by rotation of tooth 156, cause advancement of magazine 50 by a distance equal to two slot pitches. During this advancement, as in other movements of magazine 50, the force exerted by the tooth 156 causes the support 280 to be pivoted downwardly, against the force of spring 292, thus disengaging the rolls 290 and 292 from the teeth of rack 158, and permitting the movement of magazine 50.

This advancement of magazine 50 places the second slide in magazine 50 in position with its teeth 170 engaging notches 222 and 224 in slide engaging plate 208. The movement of magazine 50 by tooth 156 has occurred during the lost motion period wherein the plate 214 is moving relative to the plate 208 with the knobs 204 and 216 sliding in the notches 206 and 218, respectively.

When the pitman 202 moves the plates 208 and 214 to the left as seen in FIG. 3, the second slide is withdrawn from the magazine placed in position for subsequent projection by unit 22. At the end of the left-hand stroke, the button 204 engages contact arm 270 to close the switch 100 thus energizing solenoid 180. The subsequent motion of tooth 186 produces a rearward movement of magazine 50 of one slot pitch. At this time, the first vacant slot in magazine 50 is aligned with slide-changer 76 to receive the previously-viewed slide from unit 24.

After the slide in unit 24 has been viewed, the operator moves contact arm 116 gradually to the left, or counterclockwise, as viewed in FIG. 10, gradually dissolving the image projected by unit 24 and developing the image cast by unit 22. When the contact arm 116 reaches the contact 130, the apparatus causes the slide-changer 76 to return the previously viewed slide from projecting unit 24 to its original place in the first slot in magazine 50. Subsequently, the magazine 50 is advanced two slot pitches by tooth 156 and the third slide in magazine 50 is withdrawn from the magazine and placed in unit 24 for subsequent viewing.

By a repetition of the movements described above, all of the slides in magazine 50 can be successively viewed and returned to their original positions in the magazine. At the end of the viewing, the magazine 50 is ready for convenient storage with the slides in position for a repetition of the viewing and accompanying talk.

Thus it will be seen that the invention provides a slide projector automatically controlled for providing, in timed relation, gradual dissolving of one view and developing the next, withdrawing slides from a magazine and returning them to the same, and step-by-step movement of the magazine to provide for the magazine being in proper registry with the withdrawing mechanism.

The construction of the inventive projector provides for both projecting slides to be located in equal distance from the viewing screen. Thus problems of focusing are eliminated.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for projecting slide images comprising a frame and a plurality of adjacent projecting units positioned side-by-side and oriented alternately to project images upon the same area of a viewing screen, each said projecting unit having a slide track, said slide tracks being coplanar, a magazine track located between said projecting units, a slide magazine slidably positioned in said magazine track for movement along a path between said projecting units, said slide magazine having a rack formed on its lower surface, yieldable positioning means engaging said rack, said positioning means being pivotally secured to the frame, said magazine comprising a pair of spaced parallel panels defining slide-containing slots therebetween, means connecting the adjacent ends of said magazine panels with each other so as to give rigidity to the magazine, said magazine panels having margins, said magazine being open between said margins of said opposed panels so as to permit slides to be inserted into and removed from said magazine from both sides thereof, a magazine advancing tooth movably mounted beneath said magazine for engagement with the rack thereof, a magazine reversing tooth movably mounted beneath said magazine for engagement with the rack thereof, solenoid means for moving said magazine advancing tooth, solenoid means for moving said magazine reversing tooth, slide-changing members for moving in said slide tracks to push previously-viewed slides from said units into said magazine and for withdrawing succeeding slides from the magazine into said projecting units, electrical circuitry for supplying electrical power to the light sources of said adjacent projecting units, a potentiometer for supplying current gradually and alternately to said light sources of said projecting units, drive means for moving said slide-changing members, a single control means for operating said potentiometer and engaging said drive means to move said slide-changing members, and electrical switches closable by said slide-changing members for delivering power to said solenoids for actuating said magazine advancing and retarding teeth.

2. A slide projecting machine comprising two adjacent units positioned side-by-side and oriented to project images upon the same area of a viewing screen, each unit having an electric light source therein, a slide track in each said projecting unit for positioning a slide for projection, a slide magazine mounted between said projecting units and having slots formed therein, means for moving said slide magazine forwardly and rearwardly of the units to align successive slots in the magazine with slide tracks in the units, means for withdrawing slides one at a time from said magazine and inserting them into said units and for returning slides from the units to said magazine, an electrical circuit for supplying electrical current to the light sources in the projecting units, means for gradually increasing the current supplied to one of said light sources while simultaneously gradually decreasing the current supplied to the other of said light sources thereby to gradually dissolve one image from the viewing screen while simultaneously developing another image on the viewing screen; and a single operating means for controlling the current to said light sources, actuating said magazine moving means, and actuating said slide withdrawal and return means.

3. The invention as set forth in claim 2 wherein said slide magazine has a rack formed on its lower surface, said magazine moving means includes a magazine-advancing pawl for engaging said rack and advancing the magazine two slots, a first solenoid for actuating said magazine advancing pawl, a magazine-reversing pawl for engaging said rack and reversing said magazine one slot, a second solenoid for actuating said magazine-reversing pawl, means for supplying electrical power to said solenoids, said slide withdrawal and return means controlling said electrical supply means to said solenoids at predetermined times.

4. In a slide projecting machine, the combination of two adjacent units positioned side-by-side and oriented to project images upon the same area of a viewing screen, a slide track in each said projecting unit for positioning a slide for projection, a slide magazine mounted between said projecting units and having slots formed therein, means for moving said slide magazine forwardly and rearwardly of the units to align successive slots in the magazine with the slide tracks in the units, means for withdrawing slides one at a time from said magazine and inserting them into said units and for returning slides from the units to said magazine, and, means for operating said slide withdrawal and return means in timed relation with said magazine moving means.

5. In a multiple slide projecting machine, at least two adjacent units positioned side-by-side for projecting images upon the same area of a viewing screen, each unit having an electric light source therein, a slide magazine positioned between said units and constructed to contain a plurality of slides; means for withdrawing slides from said magazine, delivering them to said units and returning them to said magazine; means for feeding said magazine between said units, means for releasably locating said magazine at its various positions between said units, means for dissolving the image cast by one unit and developing the image cast by the other unit; and, a single means for controlling said image dissolving and developing means, said slide withdrawal and return means, and said magazine feeding means.

6. The invention as set forth in claim 5 wherein said slide withdrawing and return means is electrically operable, said magazine feeding means is electrically operable, and said image dissolving and developing means is electrically operable.

7. In a multiple slide projecting machine, at least two adjacent units positioned side-by-side for projecting images upon the same area of a viewing screen, each unit having an electric light source therein, a slide magazine positioned between said units and constructed to contain a plurality of slides, means for withdrawing slides from said magazine, delivering them to said units and returning them to said magazine, said means including a slide-engaging plate and a driven plate, said plates being parallel and connected to each other by a yieldable lost-motion connection, an electrically engageable clutch for actuating said plates, means for feeding said magazine between said units, said magazine feeding means including a magazine-advancing pawl and a magazine-reversing pawl, said magazine having a rack formed thereon for engagement by said pawls, solenoids for actuating said pawls, switches closeable by said slide-withdrawing and return means for energizing said solenoids, means for releasably locating said magazine at its various positions between said units, means for electrically dissolving the image cast by one unit and developing the image cast by the other unit, and a single means for controlling said slide-withdrawing and return means, said magazine feeding means and said image dissolving and developing means.

8. The invention as set forth in claim 7, wherein said magazine locating means includes a member yieldably pressed into engagement with said rack.

References Cited in the file of this patent
UNITED STATES PATENTS

| | | |
|---|---|---|
| 541,188 | Tournier | June 18, 1895 |
| 1,891,473 | Goldberg | Dec. 20, 1932 |
| 2,297,532 | Brost et al. | Sept. 29, 1942 |
| 2,530,417 | Young | Nov. 21, 1950 |
| 2,864,491 | Paterson | Dec. 16, 1958 |
| 2,900,074 | Windman | Aug. 18, 1959 |
| 2,919,021 | Robinson et al. | Dec. 29, 1959 |
| 2,931,116 | Boughton et al. | Apr. 5, 1960 |
| 2,973,689 | Bailey | Mar. 7, 1961 |
| 3,023,669 | Hall | Mar. 6, 1962 |